United States Patent [19]

Warwick

[11] Patent Number: 5,535,078
[45] Date of Patent: Jul. 9, 1996

[54] MAGNETIC MULTI-TRACK READ/WRITE HEAD WITH RECESSED CORE GAP STRUCTURE AND SHIELD ARRANGEMENT

[75] Inventor: Dennis J. Warwick, Richfield, Minn.

[73] Assignee: Data Card Corporation, Minnetonka, Minn.

[21] Appl. No.: 373,880

[22] Filed: Jan. 17, 1995

Related U.S. Application Data

[63] Continuation of Ser. No. 16,965, Feb. 12, 1993, abandoned.

[51] Int. Cl.6 .............................. G11B 5/23; G11B 5/115
[52] U.S. Cl. .............................................. 360/119; 360/128
[58] Field of Search ................................... 360/128, 129, 360/121, 124, 122, 119, 125

[56] References Cited

U.S. PATENT DOCUMENTS

| | | | |
|---|---|---|---|
| 3,252,153 | 5/1966 | Mos | 360/128 |
| 3,684,839 | 8/1972 | Homma | 360/128 |
| 3,706,132 | 12/1972 | Weaver | 360/119 |
| 3,749,850 | 7/1973 | Yagi et al. | 360/119 |
| 3,824,622 | 7/1974 | Kashimoto | 360/121 |
| 3,864,753 | 2/1975 | Becker et al. | 360/121 |
| 3,969,770 | 7/1976 | Cavallari | 360/129 |
| 4,072,994 | 2/1978 | Takashima | 360/124 |
| 4,115,827 | 9/1978 | Gooch | 360/121 |
| 4,118,747 | 10/1978 | Hanaoka et al. | 360/121 |
| 4,170,788 | 10/1979 | Hashimoto et al. | 360/129 |
| 4,217,613 | 8/1980 | Schwartz | 360/119 |
| 4,291,352 | 9/1981 | Gooch | 360/128 |
| 4,293,884 | 10/1981 | Schiller | 360/121 |
| 4,328,519 | 5/1982 | Way | 360/67 |
| 4,369,476 | 1/1983 | Karsh | 360/123 |
| 4,520,414 | 5/1985 | Latimer et al. | 360/125 |
| 4,527,212 | 7/1985 | Ricards | 360/129 |
| 4,593,336 | 6/1986 | Sansom | 360/131 |
| 4,768,118 | 8/1988 | Kuriyama | 360/121 |
| 4,841,400 | 6/1989 | Matsuzawa | 360/125 |
| 4,937,438 | 6/1990 | Warwick et al. | 235/446 |
| 4,979,051 | 12/1990 | Eggebeen | 360/21 |

FOREIGN PATENT DOCUMENTS

| | | | |
|---|---|---|---|
| 1266847 | 6/1961 | France | 360/119 |
| 52-007713 | 1/1977 | Japan | 360/119 |
| 53-020912 | 2/1978 | Japan . | |
| 53-020911 | 2/1978 | Japan . | |
| 55-160322 | 12/1980 | Japan | 360/119 |
| 63-046608 | 2/1988 | Japan | 360/119 |
| 63-224019 | 9/1988 | Japan | 360/103 |
| 63-213106 | 9/1988 | Japan | 360/119 |
| 4-038609 | 2/1992 | Japan | 360/119 |

OTHER PUBLICATIONS

"Dual–Gap Length Magnetic Heads", Faircloth, IBM Technical Disclosure Bulletin, vol. 16, No. 10, pp. 3134–3135, Mar. 1974.

*Primary Examiner*—Stuart S. Levy
*Assistant Examiner*—Craig A. Renner
*Attorney, Agent, or Firm*—Merchant, Gould, Smith, Edell, Welter & Schmidt

[57] ABSTRACT

A read/write head is used with high coercivity and low coercivity magnetic stripe in multiple-track applications. The read/write head includes a plurality of inductively wound read/write gapped cores with a recessed core gap structure, and further includes a shield situated between the cores, such that a non-magnetic space is formed between the shield and each adjacent core. The width of the shield is no greater than the width of the non-magnetic spaces.

17 Claims, 3 Drawing Sheets

FIG. 1
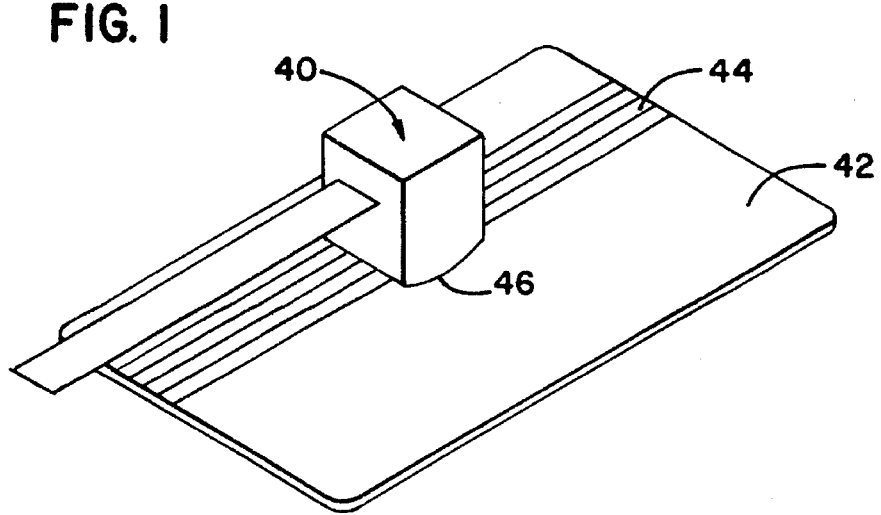
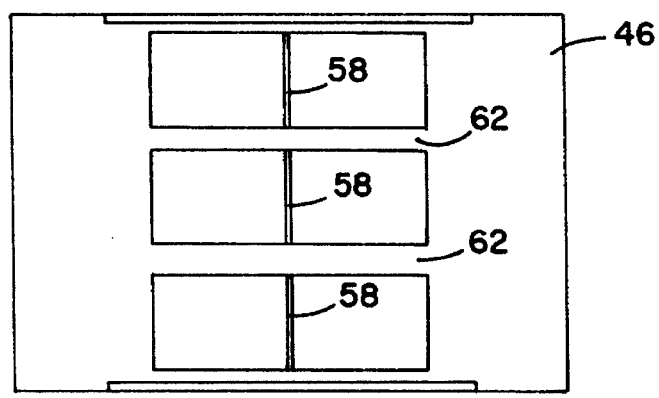
FIG. 2A
PRIOR ART
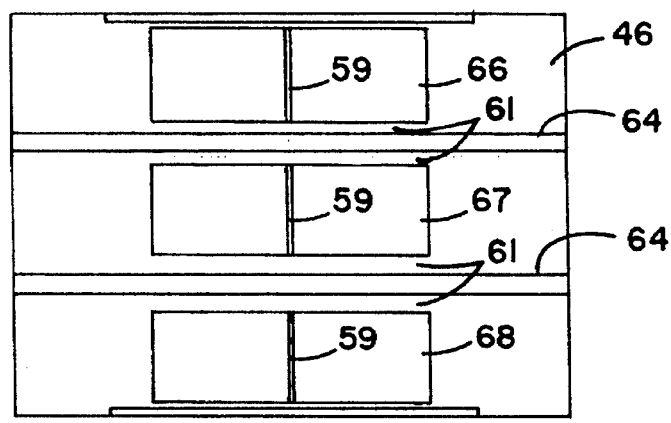
FIG. 2B
PRIOR ART

MAGNETIC MULTI-TRACK READ/WRITE HEAD WITH RECESSED CORE GAP STRUCTURE AND SHIELD ARRANGEMENT

"This is a File-Wrapper-Continuation application of application Ser. No. 08/016,965, filed Feb. 12, 1993, now abandoned."

FIELD OF THE INVENTION

The present invention relates to a magnetic read/write head for recording and subsequently detecting information on a magnetic stripe material in multiple-track magnetic recording applications.

BACKGROUND OF THE INVENTION

The popular use of magnetically recorded information in credit card or other security card applications has created the need for a more secure magnetic medium on which to record or read the information being stored on such a medium. The magnetic material used on credit cards or the like is commonly a low coercivity medium, meaning that a low magnetic field strength of between 300 Oe (Oersted) and 1000 Oe is required to change the pole orientation of the magnetic particles in the medium. The magnetic field strength of a common household magnet is great enough to erase portions of the recorded information on such a medium. To reduce the risk of losing data from magnetic records, magnetic materials have been developed with a higher coercivity range of 2700–4000 Oe which offers complete protection from damage to the magnetic record resulting from magnetic fields commonly encountered in day-to-day activities.

With the development of high coercivity magnetic record material, a corresponding need has developed for magnetic heads with sufficient sensitivity to read and write the new high coercivity material quickly and without undue interference, particularly in applications having multiple tracks in close proximity to each other.

Generally, a magnetic head comprises a coil, a magnetic core and a non-magnetic gap arranged in such a way so that an electric current in the coil will cause magnetic flux to circulate through the core and across the non-magnetic gap.

The core is made of a material having a low magnetic resistance so that the magnetic flux flows within the cross-sectional area of the core. The non-magnetic gap, however, has a high magnetic resistance so that the magnetic flux flows through a similar cross-sectional area that is larger than that of the core.

The flux lines that arc out through the magnetic medium at the non-magnetic gap are used for recording. The flux lines that arc out toward adjacent cores, when multiple track heads are used, will magnetically influence the flux flowing in those adjacent cores.

A magnetic shield is commonly disposed between cores in a multi-track head to reduce cross-talk between the adjacent cores. However, if the shield is placed too close to the core, it results in magnetic flux coupling between the adjacent cores through the shield with a corresponding increase in cross talk. The shield also provides an alternate path for magnetic flux so that instead of circulating across the non-magnetic gap, the magnetic flux flows through the shield resulting in diminished head performance.

One shortcoming of read/write heads for high coercivity media is that such heads generally require a ten-fold increase in magnetic flux circulating in the core. In multiple-track use, the higher magnetic flux level results in excessive cross-talk during a write process when trying to write two adjacent tracks at the same time.

Another shortcoming of known read/write heads for high coercivity media is that the higher write current results in an even greater increase in power dissipation and heat generation in the head. Accordingly, heat sink requirements and low duty cycle requirements may not allow the write head to operate at high throughput speeds which are required in automatic card processing systems, for example, throughput speeds of 700 cards per hour or more.

Yet another shortcoming of some known read/write heads for high coercivity media is that the read/write heads cannot be used with low coercivity media as the materials used to construct the cores have a sufficiently high magnetic remanance such that it would erase the previous encoding on a low coercivity magnetic stripe of 300 Oe, such as that used on a typical credit card, during a read cycle.

Additionally, known materials for high coercivity heads are also mechanically quite soft, in the range of $R_B 70$, and so the heads tend to wear down quickly and become unuseable. These materials can be coated with a harder material, but then optimum head performance is sacrificed, particularly in read accuracy and encoding characteristics.

Furthermore, head parameters such as inductance, which are understood by the industry and relied upon to measure the quality of head performance, do not accurately describe true head performance. Particularly, it is inaccurate to use inductance to measure the rate of increase of magnetic fields in the write process so as to measure the quality of head performance. It has been found that an indicator such as magnetic rise time, which reflects the speed of generating magnetic fields in response to electrical currents, is a more accurate measure of the performance of a read/write head.

The present invention solves these and other problems associated with existing high coercivity read/write heads.

SUMMARY OF THE INVENTION

The present invention provides an improved read/write head for use in multi-track applications on high coercivity media such that virtually all track-to-track interference is eliminated while operating at high throughput speeds. The life of the head is three to five times longer than for other high coercivity heads.

In one embodiment, the present invention provides a read/write head including two or more inductively wound, gaped cores separated by a magnetic shield material and two non-magnetic spaces on either side of the shield material. The width of the magnetic shield material is less than or equal to the width of each of the non-magnetic spaces.

In one embodiment, a three-track read/write head is used. The head comprises three cores which are separated by two magnetic shield materials and non-magnetic spaces. Generally, the distances between adjacent cores are different from each other in a standard three-track read/write head in industry. For the purpose of manufacture, in one embodiment, the cores are wider than required so that distances between the adjacent cores are the same while using cores that all have the same width.

This configuration results in a read/write head that may operate at high throughput speeds, such as 2000 cards per hour, will write three tracks simultaneously with little or no cross-talk and with little power dissipation and heat generation in the head such that no heat sinking is required.

Furthermore, the same head can be used effectively to read and write on magnetic media having a range of coercivities from 300 Oe (low coercivity) to 4000 Oe (high coercivity).

These and various other advantages and features of novelty which characterize the present invention are pointed out with particularity in the claims annexed hereto and forming a part hereof. However, for a better understanding of the invention, its advantages and objects attained by its use, attention should be given to the drawings which form a further part hereof and to the accompanying descriptive matter in which there is illustrated and described a preferred embodiment of the invention.

BRIEF DESCRIPTION OF THE DRAWINGS

Referring now to the figures in which like reference numerals represent corresponding parts throughout the several views:

FIG. 1 is a perspective view of one embodiment of a portion of a magnetic record reading and writing device including a read/write head in accordance with the present invention;

FIG. 2A is a bottom plan view of a typical three-track read/write head without magnetic shield materials;

FIG. 2B is a bottom plan view of a typical three-track read/write head with thick magnetic shield materials;

DETAILED DESCRIPTION OF THE PREFERRED EMBODIMENT

Figure 3:
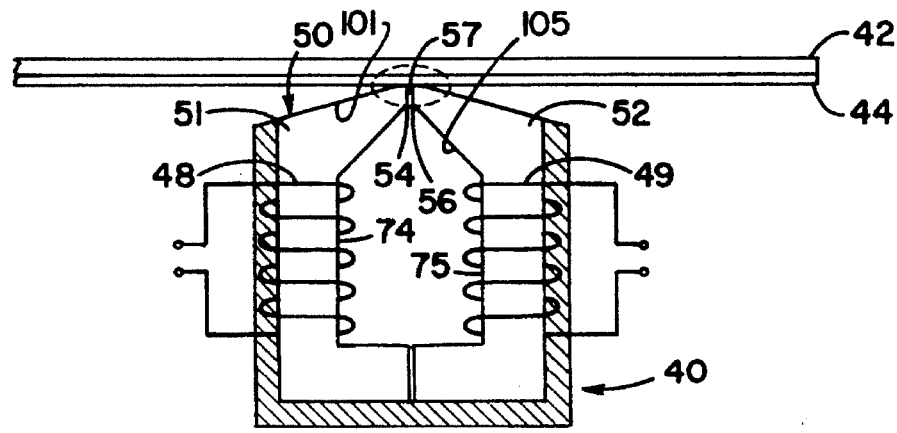
FIG. 3 is a side elevational view in cross-section of the read/write head taken generally in accordance with the present invention.

In the following detailed description of the preferred embodiment, reference is made to the accompanying drawings which form a part hereof and wherein like numerals refer to like parts throughout, and in which is shown by way of illustration a specific embodiment in which the invention may be practiced. It is to be understood that other embodiments may be utilized without departing from the scope of the present invention.

Referring to FIG. 1, there is shown a magnetic multi-track read/write head 40 generally in accordance with the principles of the present invention. The head 40 faces to and contacts a magnetic medium, such as a magnetic stripe 44, disposed on the face of a card 42 and upon which the head 40 magnetically records and reads magnetically encoded information. In the preferred embodiment, the magnetic stripe 44 is a three-track, high coercivity magnetic medium affixed to or coated on the card 42, such as a credit card or the like.

The card 42 is transported by a mechanism (not shown) to the read/write head 40 where the card 42 is urged against a face 46 of the read/write head 40 to facilitate reading of the recorded information on the magnetic stripe 44 or to enable recording of new information on the magnetic stripe 44. Various means may be utilized to position the card 42 for reading or writing on the magnetic stripe 44, including manual insertion of the card. U.S. Pat. No. 4,937,438 issued to Warwick et al. discloses a magnetics recording apparatus and its related method, the disclosure of which is incorporated herein by reference. In general, Warwick et al discloses that a card is transported along a card transport path. As the card is advanced, a magnetic stripe passes a magnetic read/write head. Information is magnetically encoded onto the magnetic stripe as the card passes the head. The card then passes the magnetic read/write head for verifying the accuracy of the encoded information.

The head 40 is both a write head and a read head. During recording, an electrical current is generated in a write coil 48 of the head 40 and so the head 40 is the write head. During reading an electrical voltage is generated in a read coil 49 of the head 40 and so the head 40 becomes the read head.

Referring to FIG. 2A, there is shown a typical read/write head having three-track read/write capability. Non-magnetic spaces 62 are disposed between adjacent read/write cores. No shield materials are disposed between the adjacent read/write cores in the spaces 62. With this configuration, a magnetic flux commonly laterally crosses the non-magnetic spaces 62 to the adjacent cores, as opposed to crossing a core gap 58 between a write half 51 and a read half 52 of the head 40, so as to create coupling between adjacent cores of the read/write head. This coupling causes track-to-track interference between adjacent tracks during the write process so that the recorded information on the magnetic stripe 44 used in conjunction with the head is inaccurate.

Referring to FIG. 2B, there is shown a typical read/write head having three-track read/write capability. Thick magnetic shield materials 64 are disposed between the adjacent read/write cores 66,67,68 in the non-magnetic spaces 61. With this configuration, the shields 64 are close enough to the cores 66,67,68 to result in magnetic flux coupling between the cores 66, 67,68 through the shield materials 64 instead of crossing core gaps 59 between the write half 51 and the read half 52 of the cores 66,67,68.

Referring to FIG. 3, the head 40 of the present invention comprises a pair of coils 48,49 which are respectively wound around core winding surfaces 74,75 of each of cores 50. The core 50 is split into two halves, the write half 51 and the read half 52. The halves 51,52 are positioned opposite to each other. A core gap 57 is formed between the write half 51 and the read half 52. The write coil 48, having two electrodes, connects to and is controlled by an electrical current source (not shown) such that a current generates a magnetic flux in the write half 51 that crosses the core gap 57 so as to form a magnetic flux loop in the core 50. The read coil 49, having two electrodes, connects to an electrical receiver (not shown) such that a magnetic flux flowing through the read half 52 and coupling through the write half 51 generates an electrical voltage in the read coil 49.

The read/write halves 52,51 have read/write head end surfaces 56,54, respectively. The read/write halves 52,51 are disposed opposite to one another such that the read/write head end surfaces 56,54 are aligned to one another. The core gap 57 is approximately formed between the write/read head end surfaces 54 and 56.

In a writing process, the coil 48 on the write half 51 is electrically charged to form a magnetic flux in the core 50. The magnetic flux crosses the core gap 57, thus, the magnetic stripe 44 is polarized by the magnetic flux flowing in the area of the gap 57 in a direction relative to the direction of current in the write coil 48.

In the reading process, the recorded information on the magnetic stripe 44 is moved past the core gap 57 where changes in magnetic orientation generate a change in the flux in the core 50 and specifically through the read half 52 which in turn causes a voltage to flow through the read coil.

In addition, the core 50 comprises a stack of a plurality of laminations, preferably made of an alloy, commonly called AlFeSil which is made of aluminum, iron and silicon. It is appreciated that the alloy generally comprises 5% of aluminum, 85% of iron and 10% of silicon. The stack of laminations is wound by 40–46 gauge wire with 180–420 turns to form inductive circuits. The core gap 57 is filled with a gap spacer which is preferably made of a Beryllium/Copper (BeCu) alloy. Alternatively, the gap spacer can be made of brass or another non-magnetic material. Each of the read/write halves 52,51 comprises at least one lamination whose thickness is not more than 0.04 inches.

Figure 4A:
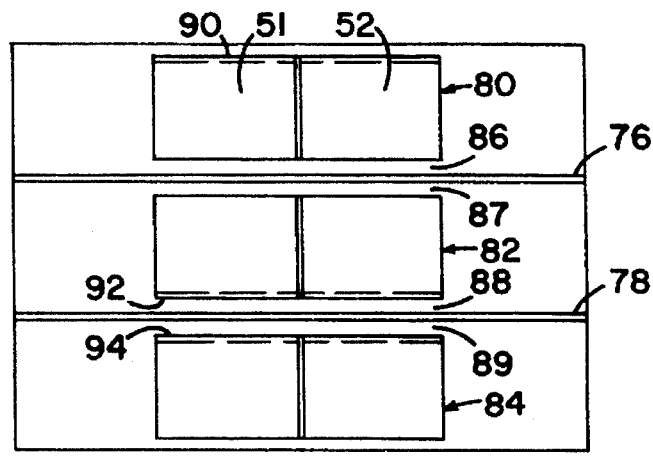
FIG. 4A is a bottom plan view of one embodiment of a three-track read/write head with thin magnetic shield materials in accordance with the present invention.

Referring to FIG. 4A, a bottom plan view of a three-track read/write head 40 in accordance with the present invention is shown. Magnetic shields 76,78 are respectively disposed between the cores 50, which are renumbered as 80,82 and 84 in FIG. 4A. Non-magnetic spaces 86,87 are respectively disposed between the cores 80,82 and the shield 76. Non-magnetic spaces 88,89 are respectively disposed between the cores 82,84 and the shield 78. In the preferred embodiment, the shields 76,78 are not wider than the spaces 86,87 nor spaces 88,89 wherein the spaces 86 and 87 have the same width, and the spaces 88 and 89 have the same width. In one embodiment, the shields 76,78 are 0.002 inches and the spaces 86,87,88,89 are 0.008 inches (hereinafter referring to 8-2-8).

Figure 4B:
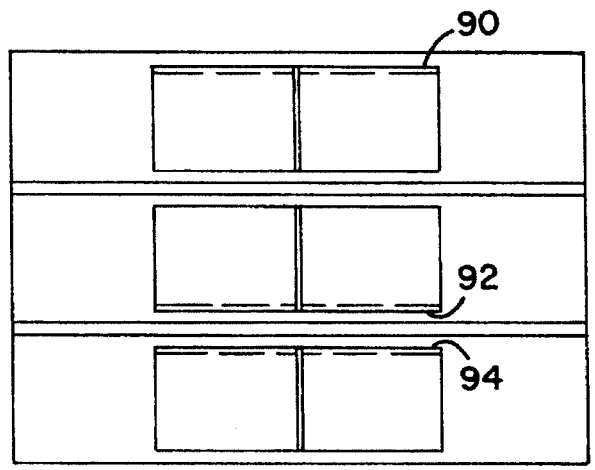
FIG. 4B is a bottom plan view of a second embodiment of a three-track read/write head with thin magnetic shield materials compared to prior art.

In another preferred embodiment shown in FIG. 4B, the shields 76,78 are 0.006 inches and the spaces 86,87,88,89 are 0.006 inches (hereinafter referring to 6-6-6). The read/write head having the 8-2-8 dimension has less cross-talk or track-to-track interference than that of the read/write head having the 6-6-6 dimension. There are many dimension combinations of the width of the shields 76,78 and spaces 86,87,88,89. The alternative combinations could be 0.004 inch shields relative to 0.007 inch spaces (7-4-7), etc.

The following table 1 generally shows various dimension combinations of the shields and spaces with respect to head performance indicated by cross-talk, track-to-track interference and rise time in response to electrical currents:

| Dimension | Cross-talk and Track-to-Track interference | Magnetic Rise Time |
| --- | --- | --- |
| 8-2-8 | Very little | quickest |
| 7-4-7 | little | quick |
| 6-6-6 | little | quick |
| 5-10-5 | some | slow |
| 4-10-4 | many | slow |
| 9-0-9 | much more | much slower |

Table 1 shows that if there is no magnetic shield material between the cores, such as dimension combination 9-0-9, there is much cross-talk between the adjacent cores of the read/write head and much track-to-track interference during recording of the adjacent tracks of the magnetic stripe 44 while the rise time in response to the electrical current is the slowest.

In addition, table 1 shows that if the dimension combination has the shield whose width is no greater than the width of the non-magnetic spaces, as shown in the first three groups, there is no or little cross-talk and track-to-track interference between the adjacent tracks. The rise time in response to the electrical current in this dimension is the quickest.

In the preferred embodiment, the shield is made of a magnetic alloy, called "HYMU 80", which generally comprises 80% Nickel, 4–5% Molybdenum and 15–16% Iron. Alternatively, the alloy can be made of any kind of magnetic material, such as AlFeSil, which is mentioned in the previous discussion.

In FIGS. 2A and 2B, the distance between two adjacent cores is different from the distance between another two adjacent cores. FIG. 2B shows that the distance between cores 66 and 67 is smaller than that of between cores 67 and 68 which is normally more difficult to manufacture. In the preferred embodiment shown in FIGS. 4A and 4B, the cores 80, 82, 84 have been made larger by the amount illustrated by portions 90,92,94, respectively, to keep the distances between the cores the same.

Figure 5:
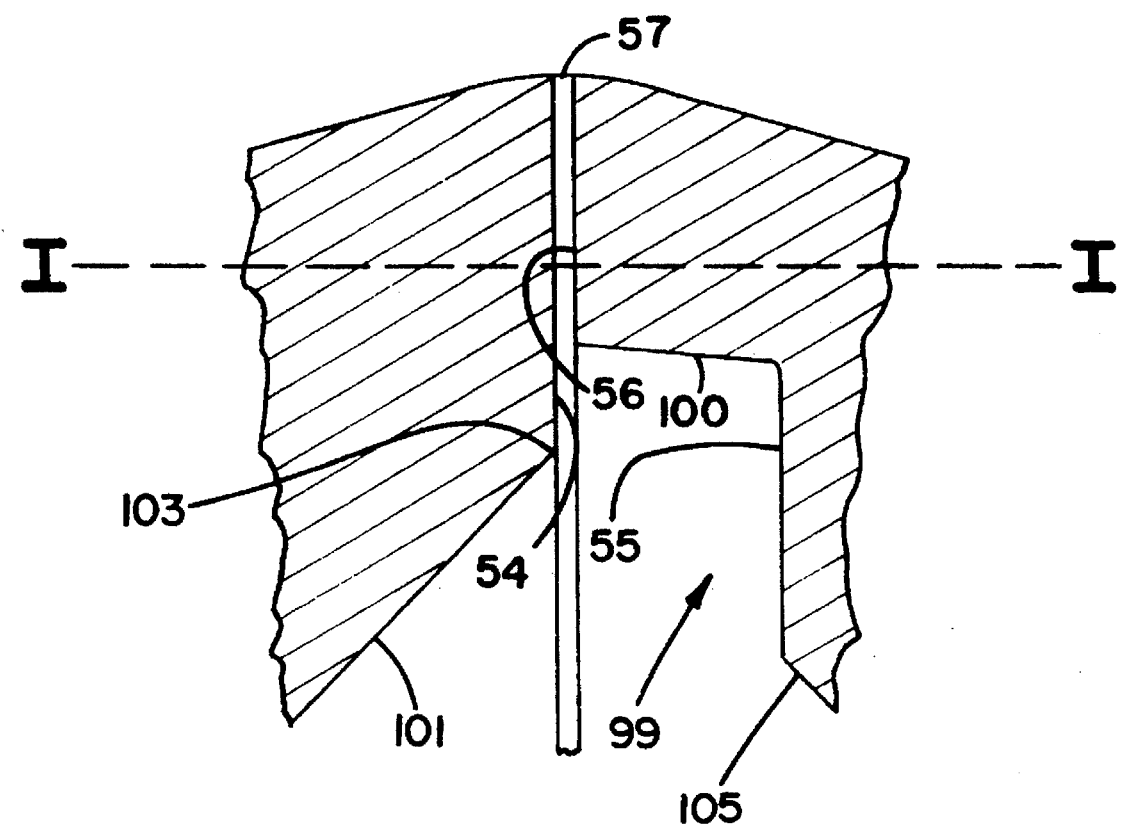
FIG. 5 is an enlarged side elevational view of a core gap shown in FIG. 3.

Now, referring to FIG. 5, there is shown an enlarged side elevational view of the core gap 57 and the write/read head end surfaces 54 and 56 of the write/read halves 51,52. The oppositely write/read head end surfaces 54 and 56 are not symmetrical wherein the read head end surface 56 comprises a recess portion 99 having a vertical surface 55 and an oblique surface 100. The write half 51 also includes a write head oblique surface 101 obliquely extending from one end 103 of the write head end surface 54. The read half 52 also includes a read head oblique surface 105. The recess portion 99 is disposed between the read head end surface 56 and the read head oblique surface 105. The vertical surface 55 of the recess portion 99 vertically extends between the oblique surface 100 of the recess portion 99 and the read head oblique surface 105. The oblique surface 100 of the recess portion 99 obliquely extends between the vertical surface 55 of the recess portion 99 and the read head end surface 56. The write head end surface 54 and the read head end surface 56 are substantially parallel to each other. Thus, the distance between the write/read head end surfaces 54 and 56 is narrower than the distance between the write head end surface 54 and the vertical surface 55 of the recess portion 99. Accordingly, the magnetic flux is much more dense between the write/read head end surfaces 54 and 56 than between the write head end surface 54 and the vertical surface 55 of the recess portion 99. Therefore, more magnetic flux crosses through the magnetic stripe 44 so that there is less magnetic flux lost in the head 40. Further, when the core 50 is worn away toward the vertical surface 55, as illustrated by a dashed line I—I, the magnetic flux density will increase furthers between the write/read head end surfaces 54 and 56. The oblique surface 100 has a small angle below the horizontal level which is defined to be normal to the gap 57. In the preferred embodiment, the small angle is five degrees. The oblique surface 100 read head end surfaces the smallest core area will occur at the read head end surfaces 56 and not at some other area removed from the gap 57.

It is to be understood that even though numerous characteristics and advantages of the present invention have been set forth in the foregoing descriptions, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A magnetic multi-track read/write head, recording information on both high coercivity and low coercivity magnetic stripe, the head comprising:

a plurality of read/write cores, each of said plurality of read/write cores comprising a write head member having a write head end surface, a write head oblique surface obliquely extending from one end of the write head end surface, and a write head core winding surface upon which a write head coil is wound, and a read head member having a read head end surface, a read head oblique surface, a recess portion disposed between the read head end surface and the read head oblique surface, and a read head core winding surface upon which a read head coil is wound, said read/write head members being positioned adjacent to one another, said read and write head end surfaces forming a non-magnetic gap extending therebetween;

a shield being disposed between each of said plurality of read/write cores such that a first non-magnetic space is formed between said shield and one of said read/write cores and a second non-magnetic space is formed between said shield and an adjacent read/write core, a width of said shield being no greater than each of the widths of said first and second non-magnetic spaces;

the recess portion including a vertical surface and an oblique surface, the vertical surface of the recess portion vertically extending between the oblique surface of the recess portion and the read head oblique surface, and the oblique surface of the recess portion obliquely extending between the vertical surface of the recess portion and the read head end surface at a predetermined angle;

the write head end surface, the read head end surface, and the vertical surface of the recess portion being substantially parallel to each other;

wherein the predetermined angle is approximately five degrees; and wherein the one end of the write head end surface is located below the oblique surface of the recess portion and above the read head oblique surface with respect to a read/write head magnetic stripe facing surface.

2. A magnetic multi-track read/write head in accordance with claim 1, wherein the width of said shield is equal to the width of each of the first and second non-magnetic spaces.

3. A magnetic multi-track read/write head in accordance with claim 1, wherein the width of said shield is less than the width of each of the first and second non-magnetic spaces.

4. A magnetic multi-track read/write head in accordance with claim 1, wherein the write head member and the read head member are asymmetrical due to the recess portion of the read head member.

5. A magnetic multi-track read/write head in accordance with claim 1, wherein the distance between two adjacent read/write cores is equal to the distance between another two adjacent read/write cores.

6. A magnetic multi-track read/write head in accordance with claim 1, wherein each of said read/write head members has the same width.

7. A magnetic multi-track read/write head in accordance with claim 1, wherein the magnetic multi-track read/write head has three cores and the width of each of the cores is the same.

8. A magnetic multi-track read/write head in accordance with claim 1, wherein the magnetic multi-track read/write head has two cores.

9. A magnetic multi-track read/write head in accordance with claim 1, wherein the shield is made of magnetic materials.

10. A magnetic multi-track read/write head in accordance with claim 9, wherein the shield is made of an alloy comprising Nickel, Molybdenum and Iron.

11. A magnetic multi-track read/write head in accordance with claim 9, wherein the shield is made of an alloy comprising Aluminum, Iron and Silicon.

12. A magnetic multi-track read/write head in accordance with claim 1, wherein the non-magnetic gap is filled with an alloy comprising Beryllium and Copper.

13. A magnetic multi-track read/write head in accordance with claim 1, wherein the cores are made of an alloy comprising Aluminum, Iron and Silicon.

14. A magnetic read/write head, recording information on both high coercivity and low coercivity magnetic stripe, the magnetic read/write head comprising:

a read/write core comprising a write head member having a write head end surface, a write head oblique surface obliquely extending from one end of the write head end surface, and a write head core winding surface upon which a write head coil is wound, and a read head member having a read head end surface, a read head oblique surface, a recess portion disposed between the read head end surface and the read head oblique surface, and a read head core winding surface upon which a read head coil is wound, said read/write head members being positioned adjacent to one another, said read and write head end surfaces forming a non-magnetic gap extending therebetween;

the recess portion including a vertical surface and an oblique surface, the vertical surface of the recess portion vertically extending between the oblique surface of the recess portion and the read head oblique surface, and the oblique surface of the recess portion obliquely extending between the vertical surface of the recess portion and the read head end surface at a predetermined angle;

the write head end surface, the read head end surface, and the vertical surface of the recess portion being substantially parallel to each other;

wherein the predetermined angle is approximately five degrees; and wherein the one end of the write head end surface is located below the oblique surface of the recess portion and above the read head oblique surface with respect to a read/write head magnetic stripe facing surface.

15. A magnetic read/write head in accordance with claim 14, wherein the non-magnetic gap is filled with an alloy comprising Beryllium and Copper.

16. A magnetic read/write head in accordance with claim 14, wherein the read/write core is made of an alloy comprising Aluminum, Iron and Silicon.

17. A magnetic read/write head in accordance with claim 14, wherein the write head member and the read head member are asymmetrical due to the recess portion of the read head member.

* * * * *